United States Patent [19]
Hoover

[11] Patent Number: 5,465,801
[45] Date of Patent: Nov. 14, 1995

[54] MOTORIZED WHEELBARROW

[76] Inventor: Terry A. Hoover, 5047 Willie Rd., Orangeburg, S.C. 29115

[21] Appl. No.: 210,472

[22] Filed: Mar. 21, 1994

[51] Int. Cl.⁶ .................................................. B62D 51/04
[52] U.S. Cl. ........................ 180/19.1; 180/13; 180/65.1; 280/47.26; 298/5
[58] Field of Search ........................... 180/13, 19.1, 19.3, 180/283, 65.1, 65.2, 65.3, 282; 280/659, 43.1, 47.131, 47.19, 47.2, 47.24, 47.26, 47.31, DIG. 5; D34/16; 298/5, 1 C, 17 S

[56] References Cited

U.S. PATENT DOCUMENTS

| | | | |
|---|---|---|---|
| 2,533,549 | 12/1950 | Bell | 180/19.3 X |
| 2,638,172 | 5/1953 | Borchin et al. | 180/19.1 |
| 3,580,346 | 5/1971 | McLaren | 180/19.1 |
| 3,791,470 | 2/1974 | Baddore | 180/19.1 |
| 3,891,043 | 6/1975 | Valdex | 180/113 |
| 4,589,508 | 5/1986 | Hoover et al. | 180/13 X |
| 5,033,760 | 7/1991 | Evans | 280/47.26 |
| 5,211,254 | 5/1993 | Harris, III et al. | 180/19.1 |
| 5,284,218 | 2/1994 | Rusher, Jr. | 180/19.3 X |
| 5,305,843 | 4/1994 | Armstrong | 180/19.1 |
| 5,350,030 | 9/1994 | Mawhinney et al. | 180/65.2 X |

FOREIGN PATENT DOCUMENTS

| | | | |
|---|---|---|---|
| 4030879 | 4/1991 | Germany | 180/19.1 |

*Primary Examiner*—Margaret A. Focarino
*Assistant Examiner*—F. Zeender

[57] ABSTRACT

A motorized wheelbarrow for transporting materials placed therein from one location to another comprising a rigid container having a front portion, a rear portion, a lower portion, an opened upper portion, and a hollow space disposed between the portions adapted for holding materials to be transported; an elongated axle coupled to the lower portion of the container adjacent to the front portion thereof; a pair of wheels, each wheel rotatably coupled to an end of the axle; a pair of legs extending downwards from the lower portion of the container adjacent to the rear portion thereof for holding the container in a generally level and stationary position; a pair of handles coupled to the container and extended from the rear portion thereof for raising the rear portion; a motor coupled to the container; a drive mechanism coupled between the motor and axle for transferring rotational motion from the motor to the axle and wheels for transporting the container; a battery coupled to the container for energizing the motor; and a control switch connected between the motor and the battery and coupled to one of the handles, the control switch operable in one orientation to energize the motor and another orientation to de-energize the motor.

4 Claims, 4 Drawing Sheets

MOTORIZED WHEELBARROW

BACKGROUND OF THE INVENTION

1. Field of the Invention

The present invention relates to a motorized wheelbarrow and more particularly pertains to transporting materials from one location to another with a motorized wheelbarrow.

2. Description of the Prior Art

The use of wheelbarrows is known in the prior art. More specifically, wheelbarrows heretofore devised and utilized for the purpose of transporting materials placed therein from one location to another are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,021,625 to Stasse discloses an engine powered wheelbarrow. U.S. Pat. No. 3,791,470 to Baddore et al. discloses a motorized wheelbarrow. U.S. Pat. No. 3,891,043 to Valdex discloses a self-propelled earth moving device. U.S. Pat. No. 4,144,945 to Hamilton discloses a motorized garden plow or cultivator. U.S. Pat. No. 4,589,508 to Hoover et al. discloses a motorized wheelbarrow.

While these devices fulfill their respective, particular objective and requirements, the aforementioned patents do not describe a motorized wheelbarrow with switches that control motor operations based on the position and orientation of the container and handles.

In this respect, the motorized wheelbarrow according to the present invention substantially departs from the conventional concepts and designs of the prior art, and in doing so provides an apparatus primarily developed for the purpose of transporting materials placed therein from one location to another.

Therefore, it can be appreciated that there exists a continuing need for new and improved motorized wheelbarrow which can be used for transporting materials placed therein from one location to another. In this regard, the present invention substantially fulfills this need.

SUMMARY OF THE INVENTION

In the view of the foregoing disadvantages inherent in the known types of wheelbarrows now present in the prior art, the present invention provides an improved motorized wheelbarrow. As such, the general purpose of the present invention, which will be described subsequently in greater detail, is to provide a new and improved motorized wheelbarrow and method which has all the advantages of the prior art and none of the disadvantages.

To attain this, the present invention essentially comprises, in combination, a rigid and elongated container having a front portion, a rear portion, a lower portion, an opened upper portion, and a hollow space disposed between the portions adapted for holding materials to be transported. An elongated axle is included and is coupled to the lower portion of the container adjacent to the front portion thereof with the axle further having a drive sprocket coupled thereto. A pair of wheels is included with each wheel rotatably coupled to an end of the axle. A pair of spaced and rigid V-shaped legs is included and extend downwards from the lower portion of the container adjacent to the rear portion thereof for holding the container in a generally level and stationary position. A pair of handles is included with each handle formed of a rod wherein the rod is of a generally rigid material. Each rod has a lower end, an upper end, and an intermediate location therebetween. Each rod further includes a lower segment and an upper segment. The lower end of the rod is coupled to an end of an axle with the lower segment extended angularly upwards therefrom to the intermediate location. The upper segment is extended from the intermediate location to the upper end such that the upper end is offset from the rear portion of the container. Each handle includes a grip formed on the upper end adapted for allowing a user a firm hold for lifting the handles upward to raise the rear portion of the container, thereby enabling the container to be transported on the wheels from one location to another. A motor is included and has a fixed stator and a rotatable rotor with the stator coupled to the lower portion of the container. The motor further includes three modes of operation for producing forward rotation of the stator in a forward mode, reverse rotation of the stator in a reverse mode, and no rotation of the stator in a neutral mode. A belt is included and is coupled around the rotor of the motor and the drive sprocket on the axle for transferring rotational motion from the motor to the axle and wheels for transporting the container. A hollow battery box is included and is coupled to the rear portion of the container. The battery box has an opening and a lid pivotally coupled thereto for sealing the opening. A battery for energizing the motor is included and is disposed in the battery box. A pair of foot pedal switches is included and connected between the motor and battery with each foot pedal switch coupled to a leg and extended downwards therefrom. Each foot pedal switch is operable in an extended orientation to energize the motor when the handles are lifted upwards and a retracted orientation to de-energize the motor when the handles are released. A level control switch is included and connected between the motor and the battery and coupled to the front portion of the container with the switch having an elongated and essentially vertical cavity with liquid mercury disposed therein. The switch is operable in a tilted orientation to energize the motor when the handles are lifted upwards and a leveled orientation to de-energize the motor when the handles are released. A control switch is included and connected between the motor and the battery and coupled to one of the handles with the control switch operable in a first orientation to place the motor in the forward mode, a second orientation to place the motor in the reverse mode, and a third orientation to place the motor in a neutral mode.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved motorized wheelbarrow which has all the advantages of the prior art wheelbarrows and none of the disadvantages.

It is another object of the present invention to provide a new and improved motorized wheelbarrow which may be easily and efficiently manufactured and marketed.

It is a further object of the present invention to provide a new and improved motorized wheelbarrow which is of durable and reliable construction.

An even further object of the present invention is to provide a new and improved motorized wheelbarrow which is susceptible of a low cost of manufacture with regard to both materials and labor, and which accordingly is then susceptible of low prices of sale to the consuming public, thereby making such a motorized wheelbarrow economically available to the buying public.

Still yet another object of the present invention is to provide a new and improved motorized wheelbarrow which provides in the apparatuses and methods of the prior art some of the advantages thereof, while simultaneously overcoming some of the disadvantages normally associated therewith.

Even still another object of the present invention is to provide a new and improved motorized wheelbarrow for transporting materials placed therein from one location to another.

Lastly, it is an object of the present invention to provide a new and improved motorized wheelbarrow comprising a rigid container having a front portion, a rear portion, a lower portion, an opened upper portion, and a hollow space disposed between the portions adapted for holding materials to be transported; an elongated axle coupled to the lower portion of the container adjacent to the front portion thereof; a pair of wheels, each wheel rotatably coupled to an end of the axle; a pair of legs extending downwards from the lower portion of the container adjacent to the rear portion thereof for holding the container in a generally level and stationary position; a pair of handles coupled to the container and extended from the rear portion thereof for raising the rear portion; a motor coupled to the container; drive means coupled between the motor and axle for transferring rotational motion from the motor to the axle and wheels for transporting the container; a battery coupled to the container for energizing the motor; and a control switch coupled to one of the handles, the control switch operable in one orientation to energize the motor and another orientation to de-energize the motor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
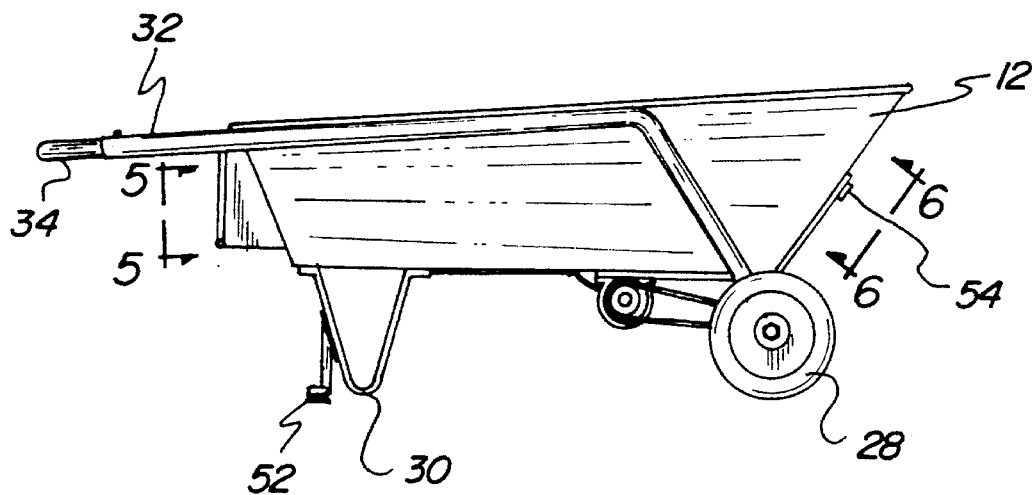
FIG. 1 is a perspective view of the preferred embodiment of the motorized wheelbarrow constructed in accordance with the principles of the present invention.
Figure 2:
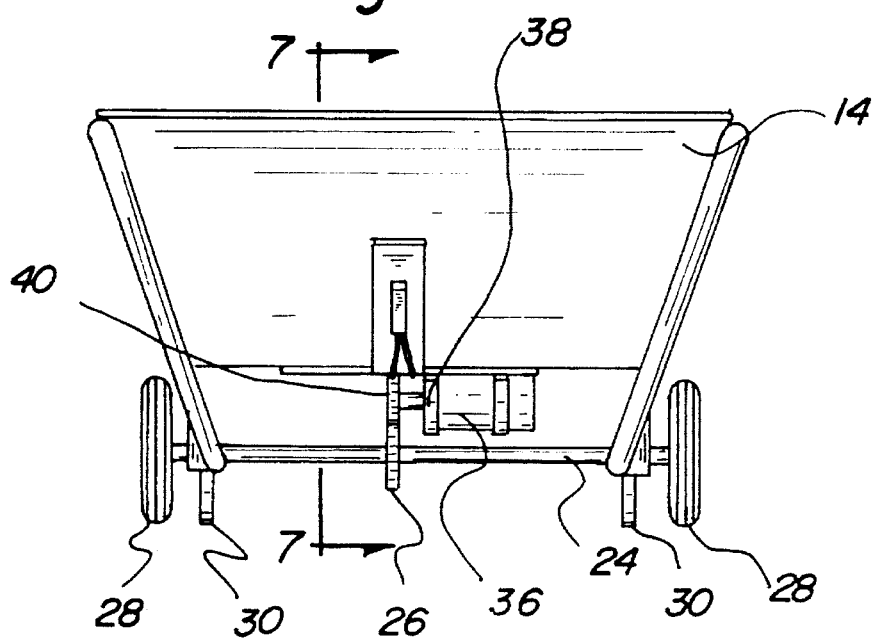
FIG. 2 is a front elevational view of the present invention.
Figure 3:
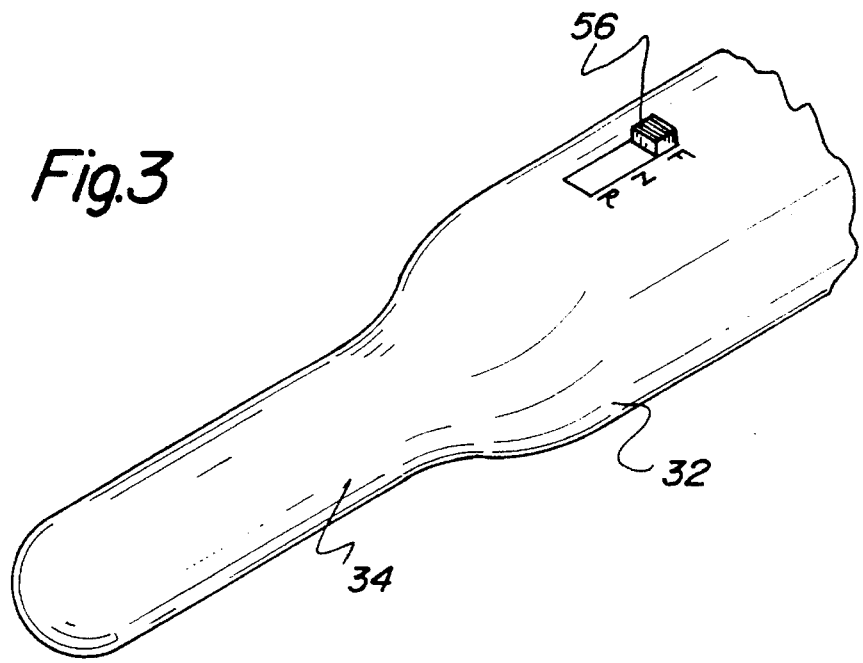
FIG. 3 is an enlarged view of the handle and control switch of the present invention.
Figure 4:
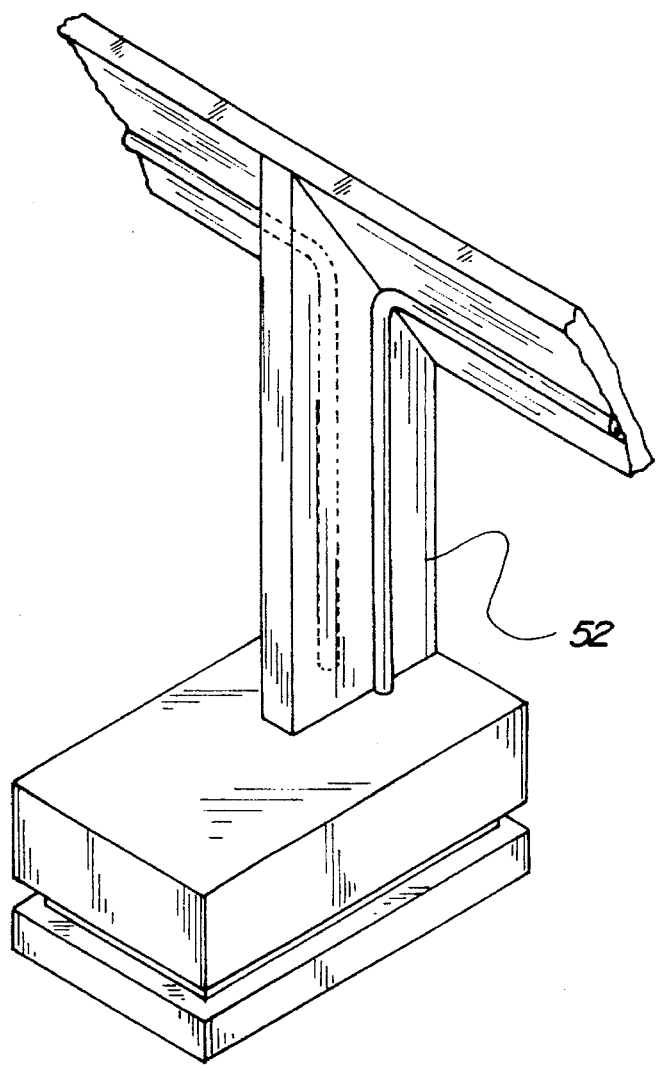
FIG. 4 is a perspective view of a foot pedal switch of the present invention.
Figure 5:
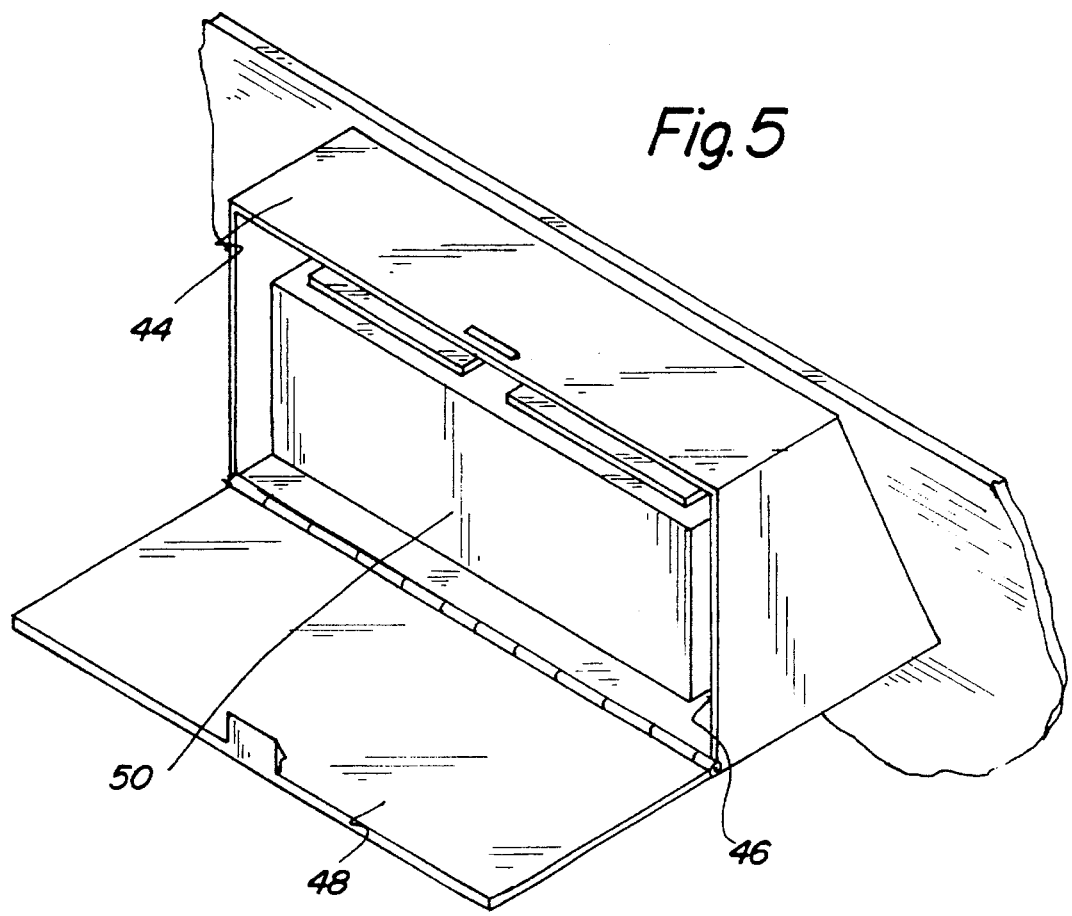
FIG. 5 is a enlarged view of the battery box and battery taken along the line 5—5 of FIG. 1.
Figure 6:
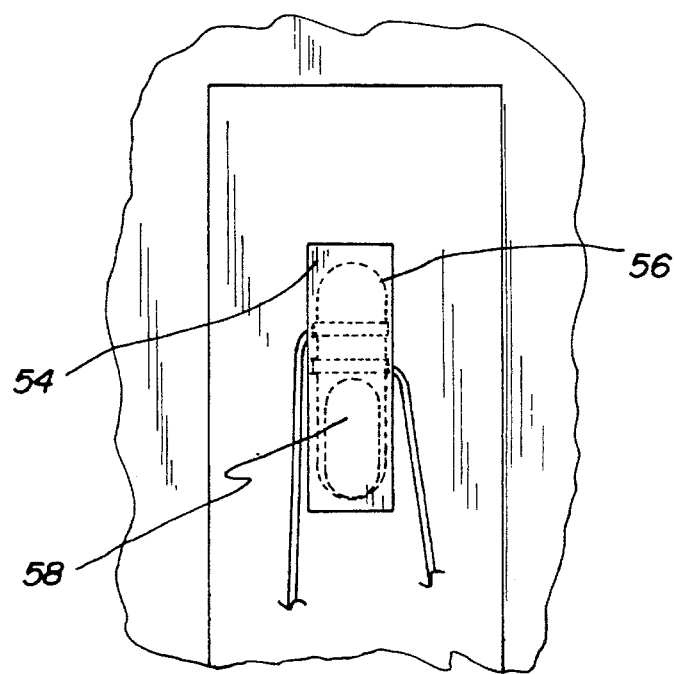
FIG. 6 is an enlarged view of the level control switch taken along the line 6—6 of FIG. 1.
Figure 7:
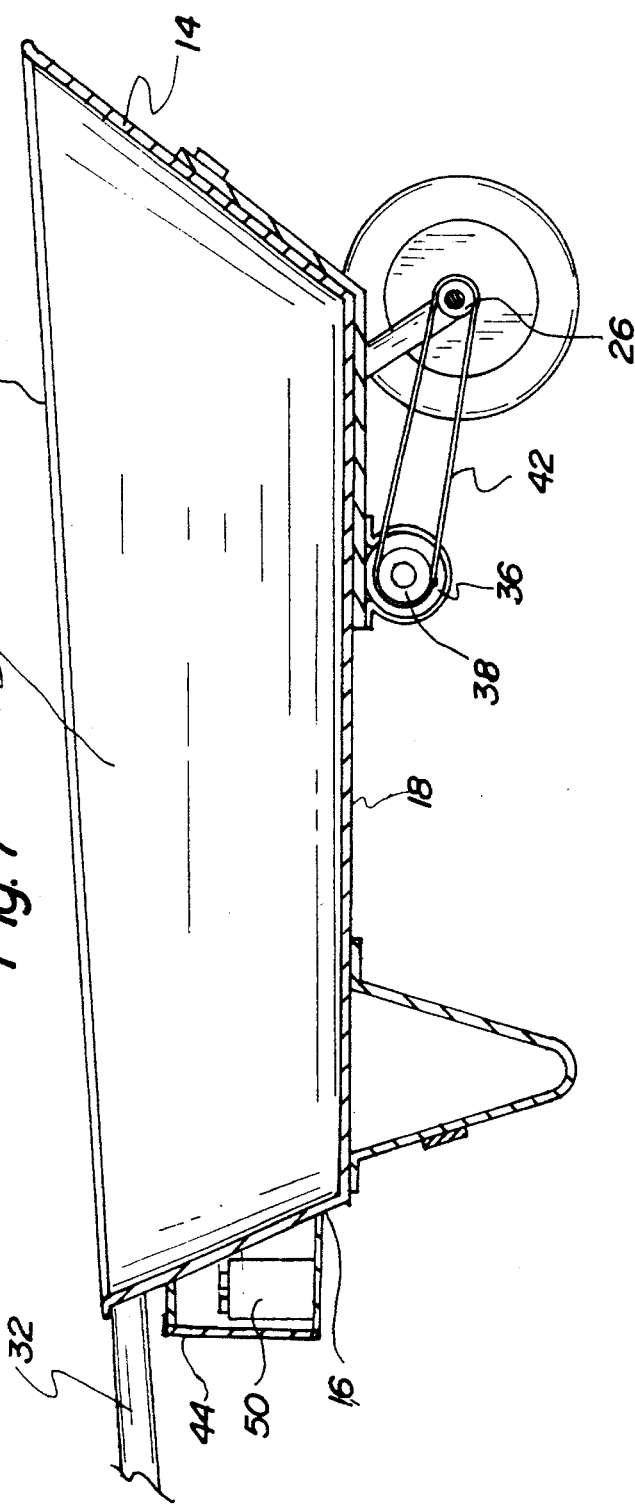
FIG. 7 is a cross-sectional view of the present invention of FIG. 1.
Figure 8:
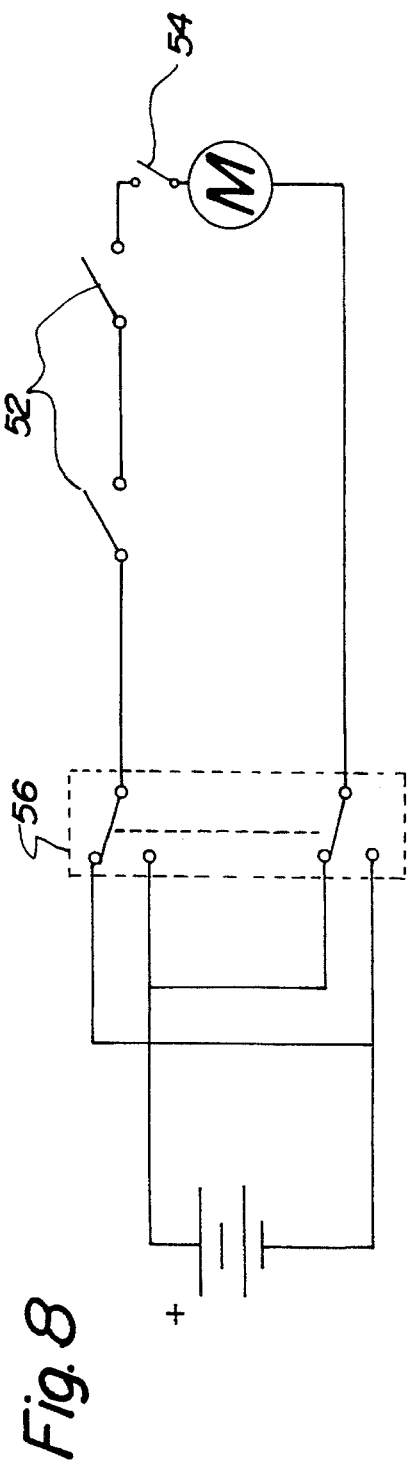
FIG. 8 is a view of the circuitry and switch mechanisms used to activate and deactivate the motor of the present invention.

With reference now to the drawings, and in particular, to FIG. 1 thereof, the preferred embodiment of the new and improved motorized wheelbarrow embodying the principles and concepts of the present invention and generally designated by the reference number 10 will be described.

Specifically, the present invention includes twelve major components. The major components are the container, axle, wheels, legs, handles, motor, belt, battery box, battery, foot pedal switches, level control switch and control switch. These components are interrelated to provide the intended function.

More specifically, it will be noted in the various Figures that the first major component is the container 12. The container is rigid and elongated in structure. The container has a front portion 14, a rear portion 16, a lower portion 18, an opened upper portion 20, and a hollow space 22 disposed between the portions. The container is adapted for holding materials to be transported.

The second major component is the axle 24. The axle is rigid and elongated in structure. The axle is coupled to the lower portion 18 of the container and positioned adjacent to the front portion 14 thereof. The axle further includes a drive sprocket 26 coupled thereto.

The third major component is the wheels 28. The present invention includes a pair of wheels. Each wheel is rotatably coupled to an end of the axle. The wheels are adapted to support the container in a position offset from the ground and transport the container from one location to another. The wheels are conventional is design and commercially available.

The fourth major component is the legs 30. The present invention includes a pair of legs. Each leg is rigid and V-shaped in structure. The legs extend downwards from the lower portion 18 of the container and are positioned adjacent to the rear portion 16 thereof. The legs are adapted for holding the container in a generally level and stationary position.

The fifth major component is the handles 32. The present invention includes a pair of handles. Each handle is formed of a rod. The rod is of a generally rigid material. Each rod has a lower end, an upper end, and an intermediate location therebetween. The rod further includes a lower segment and an upper segment. The lower end is coupled to an end of an axle with the lower segment extended angularly upwards therefrom to the intermediate location. The upper segment is extended from the intermediate location to the upper end such that the upper end is offset from the rear portion 16 of the container. Each handle includes a grip 34 formed on the upper end. The grip is adapted for allowing a user a firm hold for lifting the handles upwards to raise the rear portion 16 of the container. By raising the rear portion of the container with the handles, the majority of the weight is directed towards the axle and wheels positioned near the front portion of the container, thus enabling the container to be transported on the wheels from one location to another.

The sixth major component is the motor 36. The motor has a fixed stator 38 and a rotatable rotor 40. The stator is coupled to the lower portion 18 of the container. The motor has three modes of operation. A forward mode produces forward rotation of the stator. A reverse mode produces reverse rotation of the stator. The neutral mode produces no rotation of the stator.

The seventh major component is the belt 42. The belt is coupled around the rotor 40 of the motor and the drive sprocket 26 of the axle. The belt is used to transfer rotational motion from the motor to the axle 24 and wheels 28 for transporting the container. The belt is formed of a flexible material, preferably a rubber compound. The belt is conventional is design and commercially available.

The eighth major component is the battery box 44. The battery box has a hollow portion disposed therein. The battery box is coupled to the rear portion 16 of the container. The battery box has an opening 46. A lid 48 is pivotally coupled thereto for sealing the opening in a closed configuration. The lid is secured by engaging a hook placed thereon with a latch placed on the battery box.

The ninth major component is the battery 50. The battery is disposed in the battery box 44. The battery is used to energize the motor. The battery is conventional is design and commercially available.

The tenth major component is the foot pedal switches 52. A pair of foot pedal switches are connected between the motor 36 and battery 50. Each foot pedal switch is coupled to a leg 30 and is extended downwards therefrom. Each foot pedal switch includes a lower portion telescopically coupled to an upper portion. The lower portion has a lower contact disposed thereon. The upper portion has an upper contact disposed thereon. The lower contact and upper contact are positioned such that they are opposed to each other. They are engaged when the lower portion is extended away from the upper portion and disengaged when the lower portion is retracted toward the upper portion. Each foot pedal switch is operable in an extended orientation to energize the motor 36 when the handles 32 are lifted upwards. The foot pedal switch is also operable in a retracted orientation to de-energize the motor when the handles are released.

The eleventh major component is the level control switch 54. The level control switch is connected between the motor 36 and the battery 50. The level control switch is also coupled to the front portion 14 of the container. The level control switch has an elongated and essentially vertical cavity 56 with liquid mercury 58 disposed therein. The liquid mercury is collected in the lower end when the container is placed in an essentially leveled orientation and is disposed in the upper end in a tilted orientation when the rear portion 16 of the container is raised with the handles. The switch is operable in a tilted orientation to energize the motor 36 when the handles 32 are lifted upwards. The level control switch is also operable in a leveled orientation to de-energize the motor when the handles are released.

The twelfth major component is the control switch 56. The control switch is connected between the motor 36 and the battery 50. The control switch is also coupled to one of the handles 32. The control switch is operable in a first orientation to place the motor in the forward mode, a second orientation to place the motor in the reverse mode, and a third orientation to place the motor in a neutral mode.

The two wheels provide stability when pushing or pulling the present invention. The motor provides power to maneuver the wheelbarrow and transport heavy loads. The level control switch is used to activate the motor when the rear of the container is lifted with the handles. It is used to prevent accidents by disabling the motor until the pedal switches are activated.

In the preferred embodiment, the container, rods, legs, pedals, and battery box are made of light weight plastic or heavy steel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A motorized wheelbarrow for transporting materials placed therein from one location to another comprising, in combination:

a rigid and elongated container having a front portion, a rear portion, a lower portion, an opened upper portion, and a hollow space disposed between the portions adapted for holding materials to be transported;

an elongated axle coupled to the lower portion of the container adjacent to the front portion thereof, the axle further having a drive sprocket coupled thereto;

a pair of wheels, each wheel rotatably coupled to an end of the axle;

a pair of spaced and rigid V-shaped legs extending downwards from the lower portion of the container adjacent to the rear portion thereof for holding the container in a generally level and stationary position;

a pair of handles, each handle formed of a rod wherein the rod is of a generally rigid material, each rod having a lower end, an upper end, and an intermediate location therebetween, the rod further having a lower segment and an upper segment, the lower end coupled to an end of the axle with the lower segment extended angularly upwards from the axle to the intermediate location, the upper segment extended from the intermediate location to the upper end such that the upper end is offset from the rear portion of the container, each handle including a grip formed on the upper end adapted for allowing a user a firm hold for lifting the handles upward to raise the rear portion of the container, thereby enabling the container to be transported from one location to another;

a motor having a fixed stator and a rotatable rotor with the stator coupled to the lower portion of the container, the motor further having three modes of operation for producing forward rotation of the stator in a forward mode, reverse rotation of the stator in a reverse mode, and no rotation of the stator in a neutral mode;

a belt coupled around the rotor of the motor and the drive sprocket on the axle for transferring rotational motion from the motor to the axle and wheels for transporting the container;

a hollow battery box coupled to the rear portion of the container, the battery box having an opening and a lid pivotally coupled thereto for sealing the opening;

a battery disposed in the battery box for energizing the motor;

a pair of foot pedal switches connected between the motor and battery, each foot pedal switch coupled to one of the legs and extending downwards therefrom, each foot pedal switch operable in an extended orientation to energize the motor when the handles are lifted upwards and a retracted orientation to de-energize the motor when the handles are released;

a level control switch connected between the motor and the battery and coupled to the front portion of the container, the switch having an elongated and essentially vertical cavity with liquid mercury disposed therein, the switch operable in a tilted orientation to energize the motor when the handles are lifted upwards and a leveled orientation to deenergize the motor when the handles are released; and a control switch connected between the motor and the battery and coupled to one of the handles, the control switch operable in a first orientation to place the motor in the forward mode, a second orientation to place the motor in the reverse mode, and a third orientation to place the motor in the neutral mode.

2. A motorized wheelbarrow for transporting materials placed therein from one location to another comprising, in combination:

a rigid container having a front portion, a rear portion, a lower portion, an opened upper portion, and a hollow space for holding materials to be transported;

an elongated axle coupled to the lower portion of the container adjacent to the front portion thereof;

a pair of wheels, each wheel rotatably coupled to an end of the axle;

a pair of legs extending downwards from the lower portion of the container adjacent to the rear portion thereof for holding the container in a generally level and stationary position;

a pair of handles coupled to the container and extended from the rear portion thereof for raising the rear portion;

a motor coupled to the container;

drive means coupled between the motor and axle for transferring rotational motion from the motor to the axle and wheels for transporting the container;

a battery coupled to the container for energizing the motor;

a control switch connected between the motor and the battery and coupled to one of the handles, the control switch operable in one orientation to energize the motor and another orientation to deenergize the motor; and a pair of foot pedal switches connected between the motor and the battery, each foot pedal switch coupled to one of the legs and extending downwards therefrom, each foot pedal switch operable in an extended orientation to energize the motor when the handles are lifted upwards and a retracted orientation to deenergize the motor when the handles are released.

3. The motorized wheelbarrow as set forth in claim 2 and further including a level control switch connected between the motor and the battery and coupled to the container, the level control switch operable in a tilted orientation to energize the motor when the handles are lifted upwards and a leveled orientation to deenergize the motor when the handles are released.

4. A motorized wheelbarrow for transporting materials placed therein from one location to another comprising, in combination:

a rigid container having a front portion, a rear portion, a lower portion, an opened upper portion, and a hollow space for holding materials to be transported;

an elongated axle coupled to the lower portion of the container adjacent to the front portion thereof;

a pair of wheels, each wheel rotatably coupled to an end of the axle;

a pair of legs extending downwards from the lower portion of the container adjacent to the rear portion thereof for holding the container in a generally level and stationary position;

a pair of handles coupled to the container and extended from the rear portion thereof for raising the rear portion;

a motor coupled to the container;

drive means coupled between the motor and axle for transferring rotational motion from the motor to the axle and wheels for transporting the container;

a battery coupled to the container for energizing the motor;

a control switch connected between the motor and the battery and coupled to one of the handles, the control switch operable in one orientation to energize the motor and another orientation to deenergize the motor;

a pair of foot pedal switches connected between the motor and the battery, each foot pedal switch coupled to one of the legs and extending downwards therefrom, each foot pedal switch operable in an extended orientation to energize the motor when the handles are lifted upwards and a retracted orientation to deenergize the motor when the handles are released; and a level control switch connected between the motor and the battery and coupled to the container, the level control switch operable in a tilted orientation to energize the motor when the handles are lifted upwards and a leveled orientation to deenergize the motor when the handles are released.

\* \* \* \* \*